(12) United States Patent
Bhushan et al.

(10) Patent No.: US 6,763,368 B2
(45) Date of Patent: Jul. 13, 2004

(54) METHOD AND APPARATUS FOR PERFORMING SINGLE-CYCLE ADDITION OR SUBTRACTION AND COMPARISON IN REDUNDANT FORM ARITHMETIC

(75) Inventors: Bharat Bhushan, Cupertino, CA (US); Vinod Sharma, Sunnyvale, CA (US); Edward Grochowski, San Jose, CA (US); John Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 09/746,940

(22) Filed: Dec. 22, 2000

(65) Prior Publication Data

US 2002/0013800 A1 Jan. 31, 2002

Related U.S. Application Data

(60) Provisional application No. 60/171,863, filed on Dec. 23, 1999.

(51) Int. Cl.[7] .............................................. G06F 7/04
(52) U.S. Cl. ........................................ 708/671; 708/200
(58) Field of Search ................................. 708/671, 200

(56) References Cited

U.S. PATENT DOCUMENTS

| | | | |
|---|---|---|---|
| 3,935,438 A | 1/1976 | Grupe | 235/174 |
| 4,422,143 A | 12/1983 | Guttag | 364/200 |
| 4,709,226 A | 11/1987 | Christopher | 340/347 DD |
| 4,878,192 A | 10/1989 | Nishiyama et al. | 364/768 |
| 4,890,127 A | 12/1989 | Darley | 364/786 |
| 4,967,388 A | 10/1990 | Tate | 364/760 |
| 4,972,362 A | 11/1990 | Elkind et al. | 364/760 |
| 5,114,577 A | 5/1992 | Kusano et al. | 210/198.2 |
| 5,115,408 A | 5/1992 | Darley et al. | 364/754 |
| 5,144,577 A | 9/1992 | Linnenberg | |
| 5,206,825 A | 4/1993 | Takagi et al. | 364/746.2 |
| 5,270,962 A | 12/1993 | Fettweis | 364/766 |
| 5,341,322 A | 8/1994 | Fettweis et al. | 364/764 |
| 5,386,377 A | 1/1995 | McClure | 364/787 |
| 5,418,736 A | 5/1995 | Widigen et al. | 364/786 |
| 5,659,495 A | 8/1997 | Briggs et al. | 364/736.02 |
| 5,680,339 A | 10/1997 | Moyse et al. | 364/745 |
| 5,696,954 A | 12/1997 | Guttag et al. | 395/562 |
| 5,754,819 A | 5/1998 | Lynch et al. | 395/421.08 |
| 5,764,550 A | 6/1998 | D'Souza | 364/716.04 |
| 5,808,928 A | 9/1998 | Miyoshi | 364/760.01 |
| 5,815,420 A | 9/1998 | Steiss | 364/736.04 |
| 5,923,579 A | 7/1999 | Widigen et al. | 364/786.01 |
| 6,466,960 B1 * | 10/2002 | Winters | 708/671 |
| 6,519,621 B1 | 2/2003 | Yano | 708/603 |
| 6,629,118 B1 * | 9/2003 | Hutchison et al. | 708/525 |

OTHER PUBLICATIONS

Cortadella, J. et al. "Evaluation of A+B=K Conditions Without Carry Propagation", 8092 IEEE Transactions on Computers 41, (1992) Nov., No. 11, New York, US, pp. 1484–1488.

Parhami, B., Comments on "Evaluation of A+B=K Conditions Without Carry Propagation", XP–000770188 IEEE Transactions on Computers, vol. 43, No. 4, Apr. 1994, pp. 381.

PCT International Search Report, Application No. PCT/US00/42165, date of completion of search, Jul. 3, 2001.

(List continued on next page.)

*Primary Examiner*—David H. Malzahn
(74) *Attorney, Agent, or Firm*—Larry M. Mennemeier

(57) ABSTRACT

A method and apparatus for adding numbers represented in redundant form or for subtracting numbers received in redundant form and for comparing results in redundant form for equality to an expected value. A redundant arithmetic circuit performs an arithmetic operation on operands received in redundant form to generate a result represented in redundant form. A comparator circuit is coupled with the arithmetic circuit to receive the result in redundant form and to perform an equality comparison of the result to the expected value, and to indicate the truth of said equality comparison independent of carry signal propagation from the least significant digit to the most significant digit.

19 Claims, 21 Drawing Sheets

OTHER PUBLICATIONS

Parhami, B., "Evaluation of A+B=K Conditions Without Carry Propagation," IEEE Transactions on Computers, vol. 43, No. 4, Apr. 1994.

Cortadella, J. et al., "Comments on Evaluation of A+B=K Conditions Without Carry Propagation," IEEE Transactions on Computers, vol. 41, No. 11, Nov. 1992.

Duprat, J. et al., "Ecrire les nombres autrement pour calculer plus vite," Technique et Science Informatiques, vol. 10, N0. 3, 1991 (in French).

Parhami, B. et al., "On the Implementation of Arithmetic Support Functions for Generalized Sign–Digit No. Systems," IEEE Transactions on Computers, vol. 42, No. 3, Mar. 1993.

Lutz, D. et al., "Early Zero Detection," International Conference on Computer Design, pp. 545–550, 1996.

Lutz, D. et al., "The Half–Adder Form and Early Branch Condition Resolution," Arithmetic 13, pp. 266–273, 1997.

Lutz, D. et al., "Comparison of two's complement Nos." Int. J. of Electronics, vol. 80, No. 4, pp. 513–523, 1996.

Lutz, D. et al., "Programmable Modulo–K Counters," IEEE Transactions on Circuits and Systems—I: Fundamental Theory and Applications, vol. 43, No. 11, Nov. 1996.

Obaidat, M.S. et al., "Fast multi–step addition algorithm," Int. Jnl. of Electronics, vol. 70, No. 5, pp. 839–849, 1991.

* cited by examiner

| Pair i | 0 +0 | 1 +1 | -1 +-1 | |
|---|---|---|---|---|
| Pair i -1 | any | any | any | |
| Output | $C_i = 0$ $U_i = 0$ | $C_i = 1$ $U_i = 0$ | $C_i = -1$ $U_i = 0$ | |

| Pair i | 0 +1 | -1 +0 | -1 +0 | 0 +1 |
|---|---|---|---|---|
| Pair i -1 | no -1 | no -1 | has -1 | has -1 |
| Output | $C_i = 1$ $U_i = -1$ | $C_i = 0$ $U_i = -1$ | $C_i = -1$ $U_i = 1$ | $C_i = 0$ $U_i = 1$ |

Rules for adding sign-digit numbers:
$Sum_i = C_{i-1} + U_i$

|  | $C_2S_2$ | $C_1S_1$ | $C_0S_0$ |
|---|---|---|---|
| 910 | 00 | 00 | 00 |
| 911 | 01 | 01 | 10 |
| 912 | 01 | 10 | 00 |
| 913 | 00 | 11 | 10 |
| 914 | 10 | 00 | 00 |
| 915 | 11 | 01 | 10 |
| 916 | 11 | 10 | 00 |
| 917 | 10 | 11 | 10 |

FIG. 9a

|  | $C_2S_2$ | $C_1S_1$ | $C_0S_0$ |
|---|---|---|---|
| 920 | 11 | 11 | 11 |
| 921 | 10 | 10 | 01 |
| 922 | 10 | 01 | 11 |
| 923 | 11 | 00 | 01 |
| 924 | 01 | 11 | 11 |
| 925 | 00 | 10 | 01 |
| 926 | 00 | 01 | 11 |
| 927 | 01 | 00 | 01 |

FIG. 9b

|  | $C_2S_2$ | $C_1S_1$ | $C_0S_0$ |  | $\overline{C_2S_2}$ | $\overline{C_1S_1}$ | $\overline{C_0S_0}$ |  |
|---|---|---|---|---|---|---|---|---|
| 3 = | 00 | 01 | 01 | → | 11 | 10 | 10 | = 2 |
| 2 = | 00 | 01 | 00 | → | 11 | 10 | 11 | = 3 |
| 1 = | 00 | 00 | 01 | → | 11 | 11 | 10 | = -4 |
| 0 = | 00 | 00 | 00 | → | 11 | 11 | 11 | = -3 |
| -1 = | 01 | 01 | 01 | → | 10 | 10 | 10 | = -2 |
| -2 = | 01 | 01 | 00 | → | 10 | 10 | 11 | = -1 |
| -3 = | 01 | 00 | 01 | → | 10 | 11 | 10 | = 0 |
| -4 = | 01 | 00 | 00 | → | 10 | 11 | 11 | = 1 |

$N \rightarrow \overline{N} = -N-3 \pmod 8$

FIG. 10

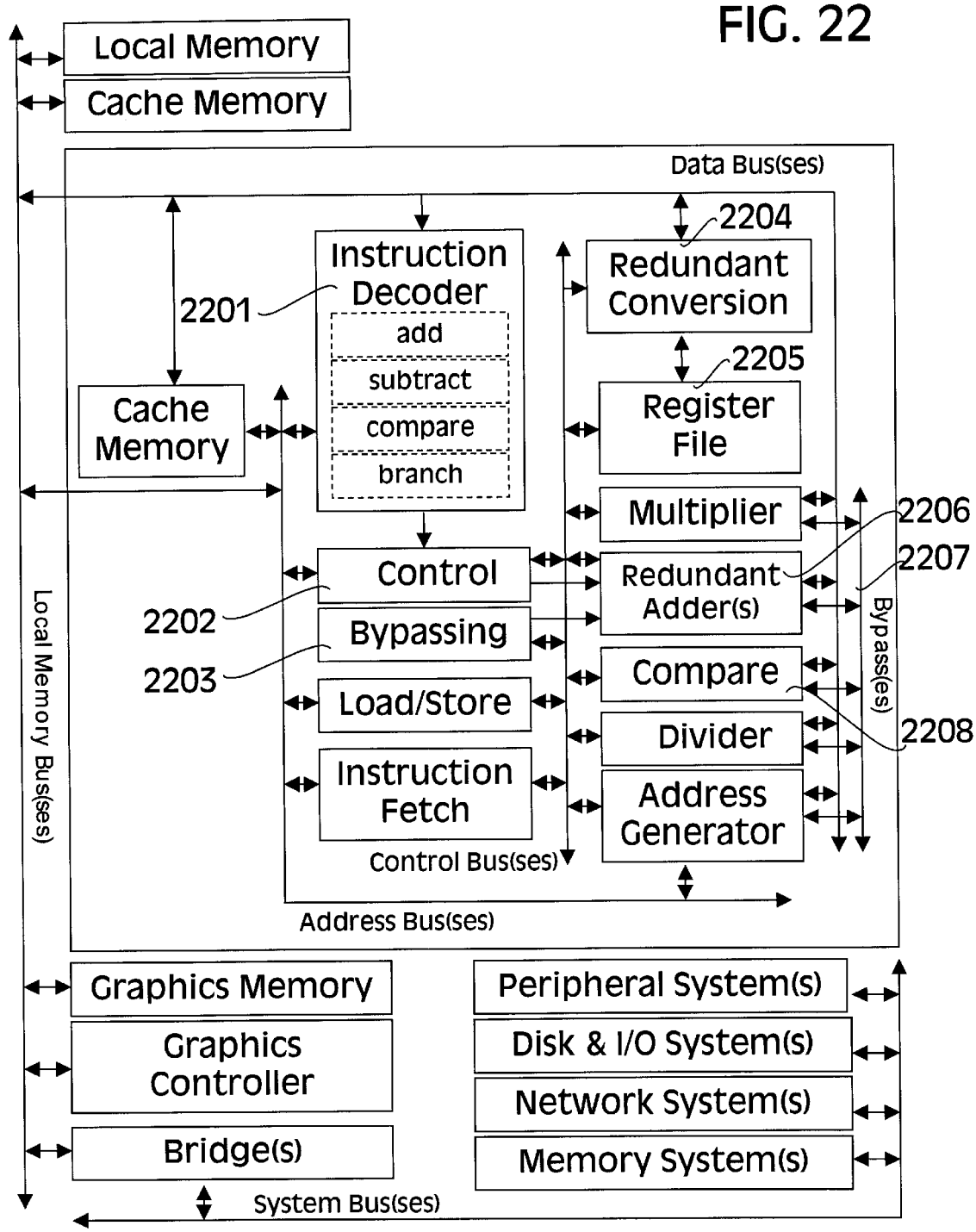

METHOD AND APPARATUS FOR PERFORMING SINGLE-CYCLE ADDITION OR SUBTRACTION AND COMPARISON IN REDUNDANT FORM ARITHMETIC

CROSS-REFERENCES TO RELATED APPLICATIONS

This non-provisional U.S. national application, filed under 35 U.S.C. § 111(a) claims, under 35 U.S.C. § 119(e)(1), the benefit of the filing date of provisional U.S. application Ser. No. 60/171,863, filed under 35 U.S.C. § 111(b) on Dec. 23, 1999.

FIELD OF THE INVENTION

The present invention relates to the field of computer operations on numbers in binary form, including addition, subtraction and equality comparisons. In particular it relates to these operations when numbers are represented in redundant form.

BACKGROUND OF THE INVENTION

In digital computations, the representation of numbers has a significant bearing upon the design of digital arithmetic circuits and therefore, upon their performance and complexity. Integer operands are represented in binary forms by ones and zeros in a base 2 number system. Three commonly used representation methods are called: sign-magnitude, one's complement, and two's complement.

FIG. 1a shows numbers represented in sign-magnitude. In sign-magnitude numbers, the most significant bit represents the sign (positive or negative) of the number. A sign-magnitude number can be negated by complementing the number's sign bit. When adding two positive or two negative numbers, the operation is straightforward. But, when the signs of the operands are different, the number with the smaller magnitude should be subtracted from the number with the larger magnitude. This makes arithmetic operations on sign-magnitude numbers cumbersome. The circuit for performing arithmetic operations must include an adder circuit, a subtracter circuit and a comparator circuit. Because of the complexity, and because of a serial dependency upon a comparison to control the arithmetic circuitry, designers have proposed other representation methods.

FIG. 1b shows numbers represented in one's complement. One way of determining the representation of a negative number in one's complement is to subtract the magnitude of the number from $2^n-1$ where n is the number of digits used in the representation. For example, if the word length is 4 bits, then $2^4-1=15$ is used, and the ones complement representation of −7 is calculated as shown in 120 of FIG. 1b.

A simpler way of determining the representation of a negative number in ones complement is to complement each bit of the corresponding positive number. This observation is key to simplifying subtraction for ones complement numbers. Since negating a number, B, is easily accomplished by digital circuitry, subtracting is accomplished through a combination of addition and negation:

$A-B=A+(-B)$.

Since there are two ways to represent zero in the ones complement representation method, addition circuitry is still slightly complicated.

FIG. 1c shows numbers represented in twos complement. In twos complement representation, there is only one representation for zero. The representation of a negative number can be determined by subtracting the magnitude of the number from $2^n$ where n is the number of digits used to represent the number. For example, to find the representation of −7 in twos compliment, $2^4=16$ is used, as in the calculation shown in 130 of FIG. 1c.

FIG. 2 shows a 4-bit adder/subtracter for numbers represented in twos complement. A benefit of twos complement is that it reduces the complexity of the adder circuit. A twos complement adder/subtracter can be simplified by implementing twos complement negation as ones complement negation followed by incrementation.

In an addition/subtraction operation, carry signals propagate from right to left (less significant positions to more significant positions) until they reach a final destination, which can include the leftmost digit of a result. The time it takes for carry signals to propagate is directly related to the time it takes for a digital arithmetic circuit to produce a result of an operation. The circuit of FIG. 2 is referred to as a ripple adder. In a ripple adder, a carry signal at stage i+1 is given as a function of the inputs at the ith stage.

FIG. 3a shows a carry-lookahead adder circuit, which uses a circuit shown in FIG. 3b to propagate the carry signal. These circuits directly produce carry propagate and carry generate signals at each stage.

The response time for a ripple adder with n stages is proportional to n, whereas the response time for a faster implementation technique such as a carry-lookahead adder is proportional to a logarithm of n.

In a system of numbers, where each number is assigned multiple binary representations, the numbers are said to be in redundant form. Further improvements in adder response times make use of numbers represented in redundant forms. For example, U.S. Pat. Nos. 4,890,127 and 5,815,420, use a signed-digit redundant representation form. Each digit is represented as a sign bit and a magnitude bit and can take on values of 1, 0, and −1.

FIG. 4 shows a circuit for calculating the sign bit and magnitude bit for each digit in the result, Z, from the digits of the operands, X and Y (as described in FIG. 2 in U.S. Pat. No. 4,890,127). Negation is simple but calculations are somewhat complicated due to sign comparisons, and some calculations can generate new carries, which must be allowed to propagate. FIG. 5 shows a set of rules to determine intermediate carries and sums, that avoids generating problematic new carries but introduces some additional computational complexity (from N. Takagi et al, "High speed VLSI multiplication algorithm with redundant binary addition tree," *IEEE Trans. On Computes,* 34 (September 1985) 789–796).

Current microprocessors make use of pipelining to reduce the cycle time and exploit parallelism within instruction streams. In order to make pipelining efficient, results from digital arithmetic circuitry are bypassed back to circuit inputs as operands for the next instruction in a pipeline. This technique is preferred over one of waiting until results could be written back to a register file, and it provides for higher utilization of a pipeline's parallelism.

Conversion from a redundant representation form to twos complement requires the propagation of carry signals. When results of a first operation are immediately required to perform a second operation, a conversion reduces the benefits of performing digital arithmetic in redundant form.

In U.S. Pat. No. 5,923,579, Widegen et al have shown a three-input comparator, where one of the inputs is an implicit constant. FIG. 6 shows a preferred embodiment of the comparator device consisting of a custom carry-save adder (CSA) structure and a carry-propagate circuit (CPC).

The custom CSA two different bit cells depending upon whether that bit position in the constant input is a one or a zero, and the CPC employs a full carry-lookahead circuit to provide the comparison result as quickly as possible.

BRIEF DESCRIPTION OF THE DRAWINGS

FIG. 9a shows all of the valid 3-digit representations using a redundant form with a carry bit and a sum bit for each binary digit of the number zero.

FIG. 9b shows all of the valid 3-digit representations using a redundant form with a carry bit and a sum bit for each binary digit of the number negative three.

FIG. 10 shows a mapping of numbers in a redundant representation having three digits that corresponds to complementation by bitwise negation.

FIG. 13 also shows two possible locations to tap results in redundant form for bypassing.

FIG. 22 shows one embodiment of a digital system comprising bypass circuitry, redundant arithmetic circuitry and comparison circuitry adapted to perform additions, subtractions and non-propagative comparisons in accordance with the methods and teachings of the present invention.

DETAILED DESCRIPTION

The present invention provides an efficient method for bypassing outputs while in redundant form to an uncomplicated arithmetic circuit that is capable of adding or subtracting numbers in redundant from and comparing a result without requiring propagation of carry signals.

For one embodiment of the invention an arithmetic circuit subtracts numbers received in redundant form and compares the result to a number K to determine equality of K to the sum or difference received in redundant form.

For another embodiment of the invention includes generating a complemented form of at least one of two numbers supplied to the arithmetic circuit in redundant form. It also includes providing adjusting input to the arithmetic circuit to augment a result produced through the arithmetic circuit to generate a valid result in redundant form of a subtraction operation, and then comparing the result to zero using a non-propagative comparator to determine equality or inequality of the two numbers in redundant form.

Yet another embodiment is described, which includes generating through the arithmetic circuit a valid outcome represented in the redundant form, and comparing the outcome using a non-propagative comparator circuit to determine equality or inequality of the outcome to a third number received as input to the comparator.

Thus at very high computation rates, efficient bypassing of operands in redundant form can be accomplished for operations including addition, subtraction and equality comparisons.

One redundant form that is useful for implementing fast arithmetic circuits uses a carry bit, $C_A$, and a sum bit, $S_A$, for each digit of the binary representation of a number, A. As will be shown in more detail below, this particular redundant form representation permits numbers to be added together using a carry-save adder.

Figure 7A:
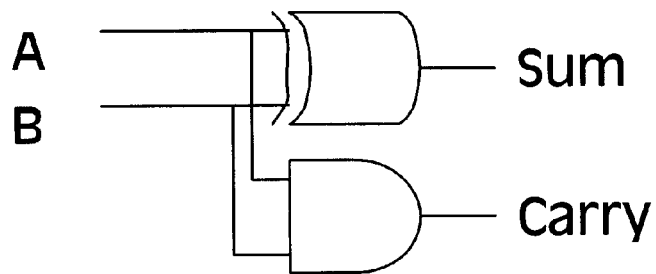
FIG. 7a shows a half adder circuit, which can be used as a building block to construct a full adder circuit.

The carry save adder has a structure very similar to that of a traditional adder except for eliminating the need to propagate carry signals along the length of the result. A carry save adder operates on numbers represented in a redundant form. Each digit position has a sum bit and a carry bit. When adding two of these numbers together, circuits similar to traditional half adders and 3:2 compressors can be used. FIG. 7a shows the traditional half adder, and FIG. 7b shows a 3:2 compressor circuit that can be used to form the basic building block of a carry save adder, according to one embodiment of the current invention.

Figure 7B:
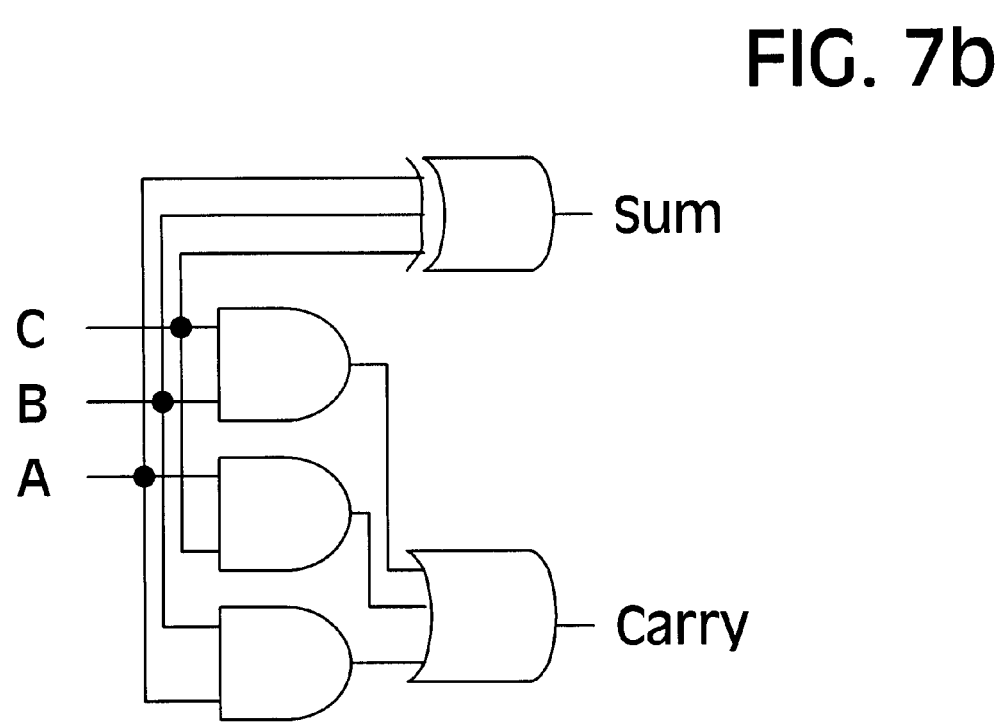
FIG. 7b shows a 3:2 compressor or counter that can be used to form the basic building block of a carry save adder.
Figures 7C, 8:
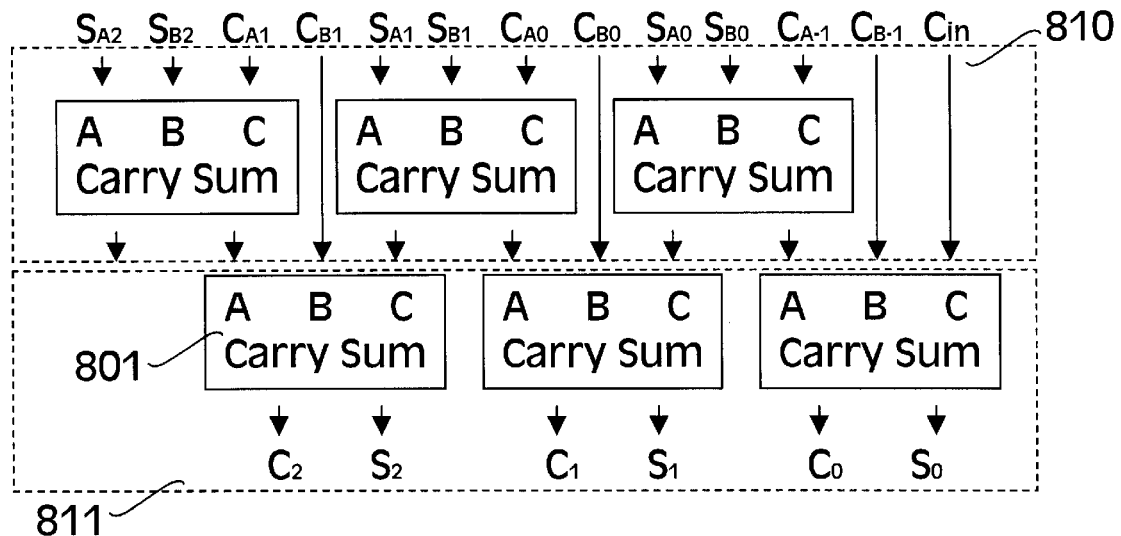
FIG. 7c shows another implementation out of numerous possible implementations of a compressor or counter device, this one using a read-only memory (ROM) circuit. Any of these numerous implementations can be used to construct a carry save adder.
FIG. 8 shows a carry save adder constructed from 3:2 compressor circuits with the same functionality as the circuits shown in FIG. 7b or FIG. 7c.

FIG. 8 shows how a carry save adder can be constructed from the 3:2 compressor circuit of FIG. 7b. If the B inputs were derived from a twos complement representation of −B, then the results produced by the digital arithmetic circuit of FIG. 8 will be one of the valid representation of A−B in a carry-sum redundant form. But if a redundant form representation of B needs to be negated, then a conversion to two's complement requires propagation of B's carry bits. The present invention provides that at least one valid carry-sum representation of −B can be produced from any valid representation of B in carry-sum redundant form.

Figure 1A:
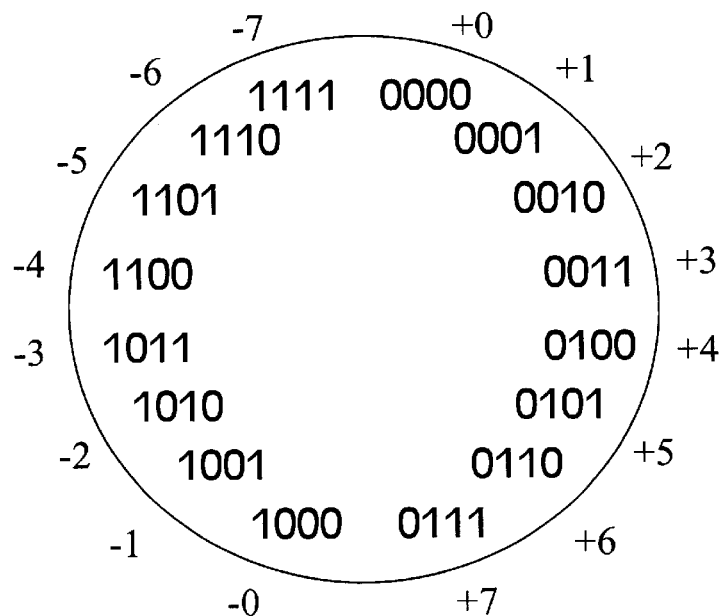
FIG. 1a shows 4-digit numbers represented in the sign-magnitude representation method.
Figure 1B:
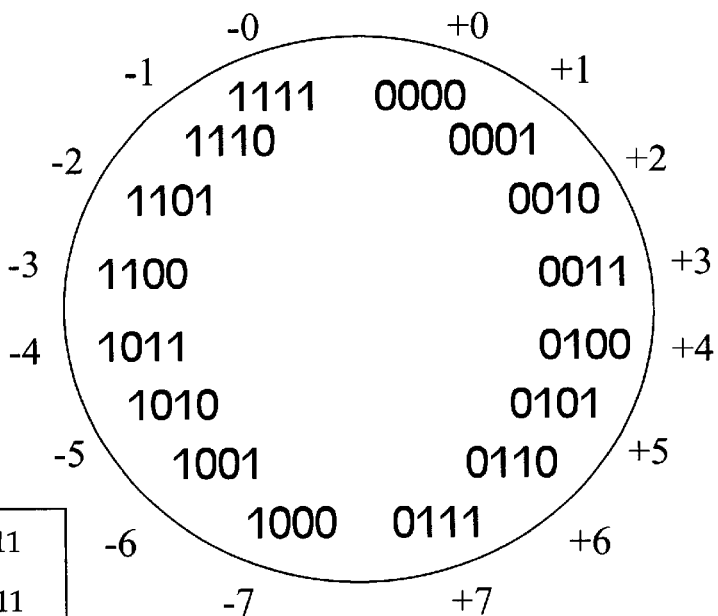
FIG. 1b shows 4-digit numbers represented in the one's complement representation method and an example of negation.
Figure 1C:
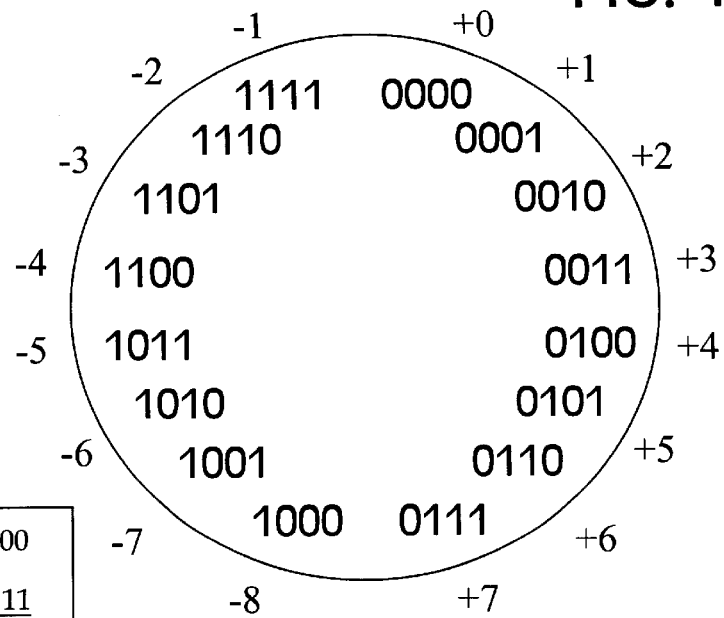
FIG. 1c shows 4-digit numbers represented in the two's complement representation method and an example of negation.
Figure 2:
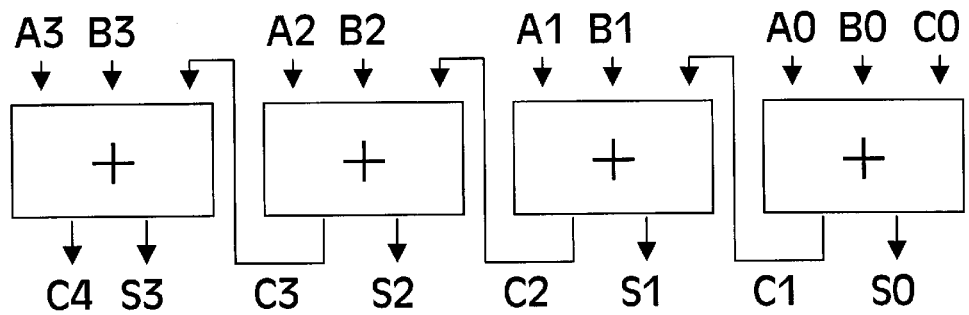
FIG. 2 shows a 4-bit ripple adder/subtracter for numbers represented in two's complement.
Figure 3A:
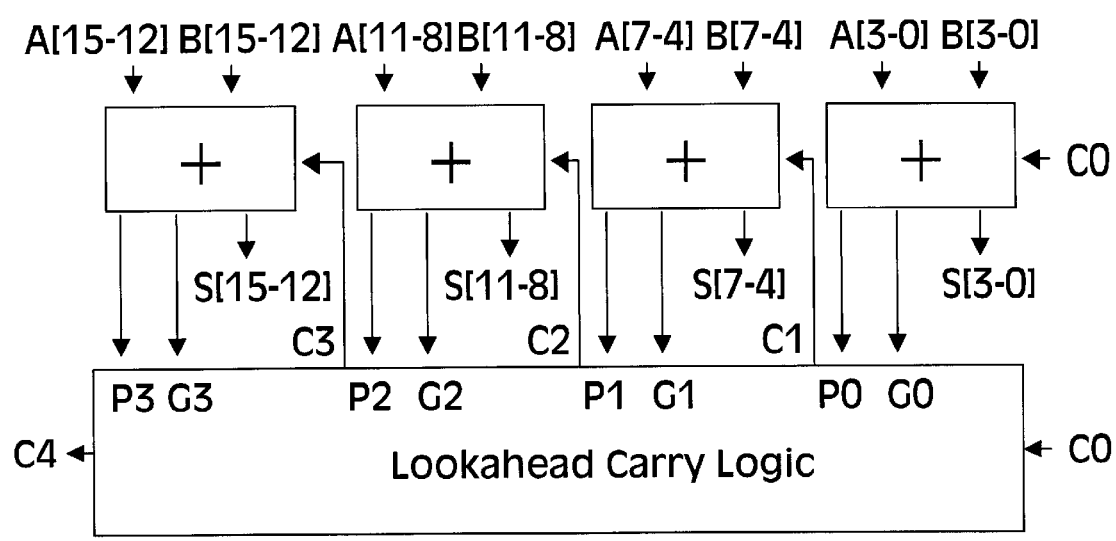
FIG. 3a shows a carry-lookahead adder circuit.
Figure 3B:
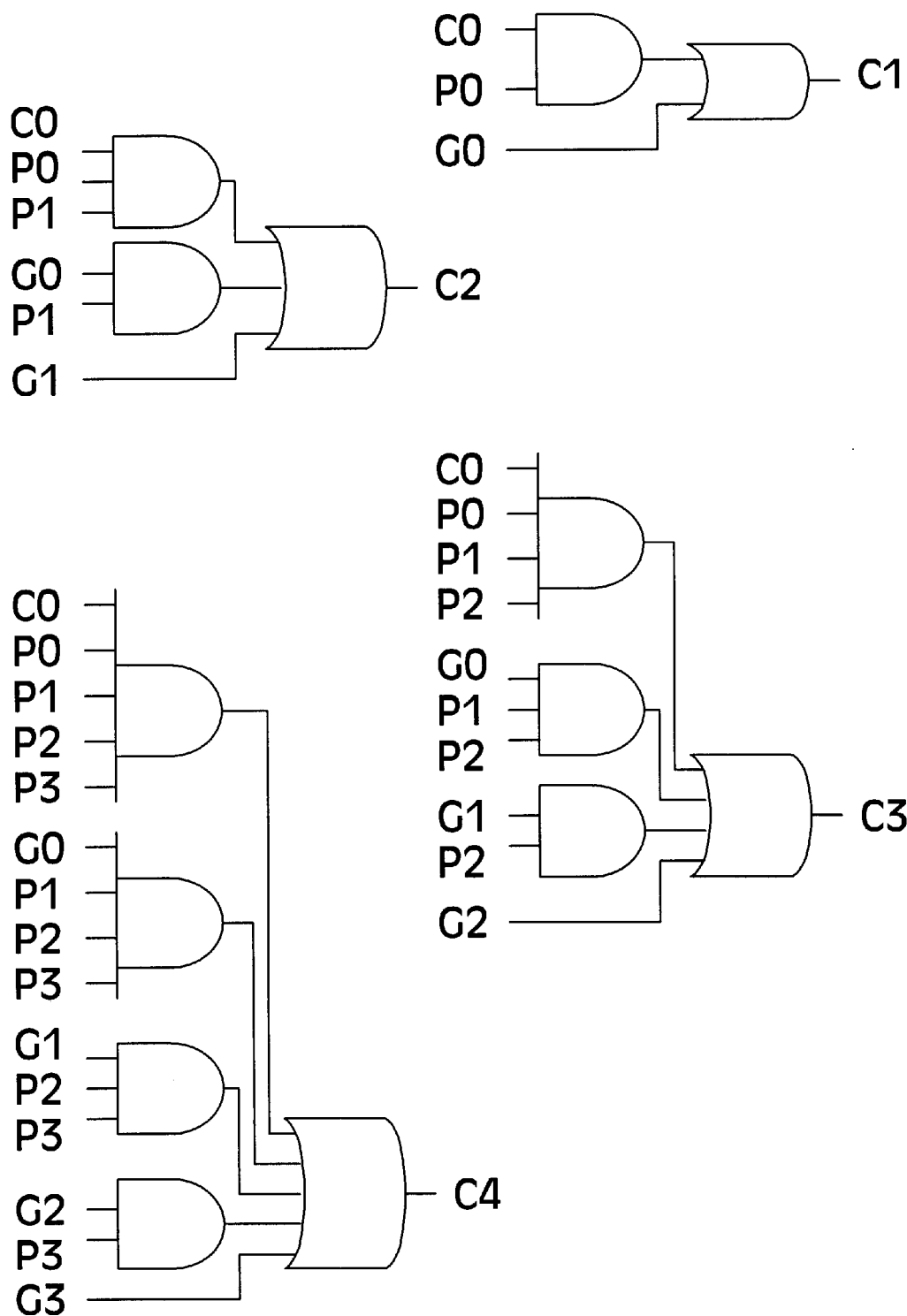
FIG. 3b shows the circuits used to produce carry propagate and carry generate signals and to propagate the carry signal in a carry-lookahead adder.
Figures 4, 5:
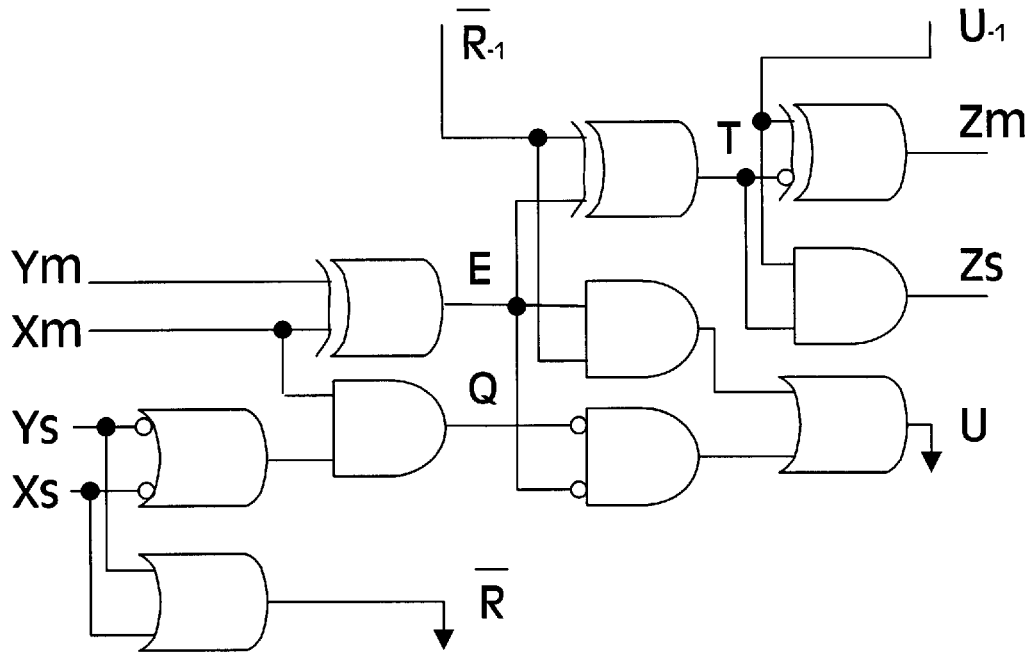
FIG. 4 shows a signed-digit adder circuit of a prior art redundant arithmetic method.
FIG. 5 shows rules for a method of adding numbers represented in signed-digit redundant form.
Figure 6:
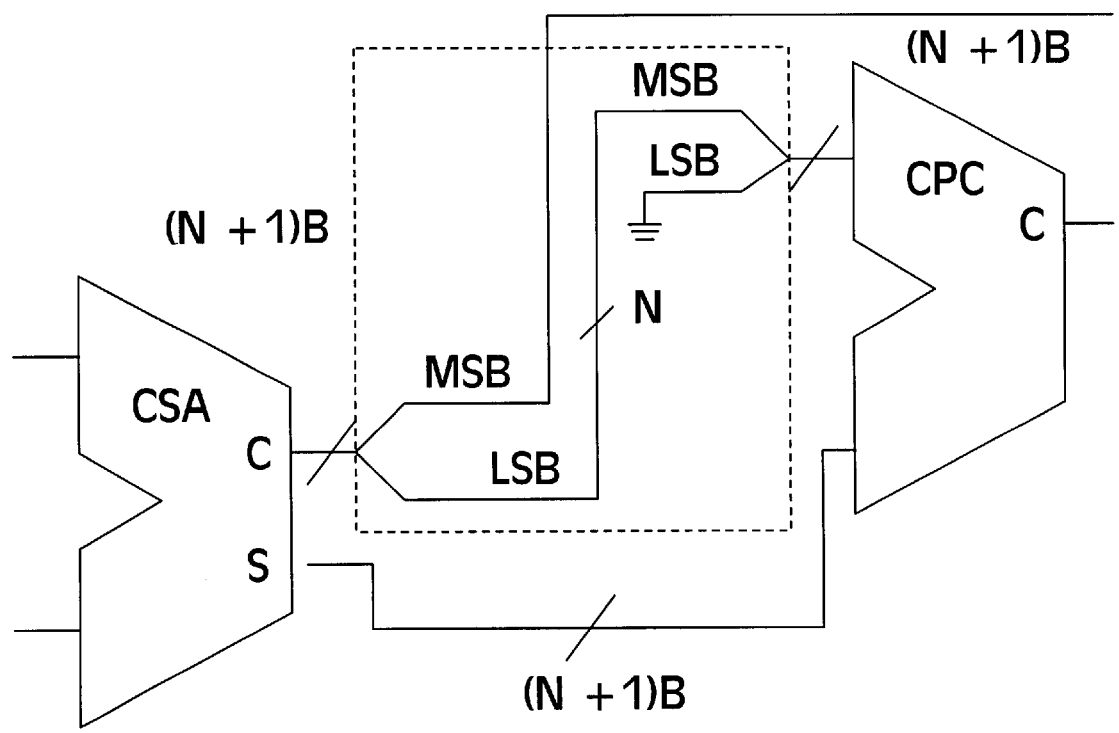
FIG. 6 shows a prior art three input comparator using a custom carry-save adder to add two inputs to an implicit constant and a carry-propagation circuit to generate a result of the comparison.

In a twos complement binary representation, where n is the number of bits used to represent the number each specific number, from $-2^{n-1}$ to $2^{n-1}$, −1 has exactly one representation. This fact is illustrated in FIG. 2c. In a redundant representation, there are multiple valid combinations that can be used to represent any number. For example, when the number, zero, is represented with carry bits and sum bits as described above, there are $2^d$ redundant representations, where d is the number of binary digits in the number. These $2^d$ representations for zero using three digits are shown in FIG. 9a. An addition operation performed on any two valid representations of zero, from FIG. 9a, using a carry-save adder will result in another one of the valid representations for zero shown in FIG. 9a.

In order to derive all of the possible redundant representations for a given number A. One could start with one valid redundant representation of A, and perform addition operations using a carry-save adder upon the initial valid representation of A, with each valid representation of zero from FIG. 9a. For example, FIG. 9b shows all of the valid redundant representations of the number negative three (−3) using three digits. Redundant representation 927 can be derived from the twos complement representation of −3 (in binary 101) by inserting 0s for each digit's carry bit. Then redundant representation 920 can be derived by adding the redundant zero representation 917 to the redundant −3 representation 927. Redundant representation 921 can be derived by adding the redundant zero representation 912 to the redundant −3 representation 927. Redundant representation 922 can be derived by adding the redundant zero representation 911 to the redundant −3 representation 927. Redundant representation 923 can be derived by adding the redundant zero representation 914 to the redundant −3 representation 927. Redundant representation 924 can be derived by adding the redundant zero representation 913 to the redundant −3 representation 927. Redundant representation 925 can be derived by adding the redundant zero representation 916 to the redundant −3 representation 927. Finally, redundant representation 926 can be derived by adding the redundant zero representation 915 to the redundant −3 representation 927.

Thus each valid redundant representation of a desired number can be derived from any other valid representation of a first number by performing addition operations using a carry-save adder with all valid redundant representations of a second number, provided that the first number and the second number sum to produce the desired number. Since it is known in the art, that a carry-save adder produces a valid result for a subtraction operation if the number being subtracted was negated in the twos complement representation method, the above description informs us that the carry-save adder produces valid results for all other redundant representations of the number to be subtracted. The present invention provides an efficient way of determining a correct redundant representation corresponding to a negation of each valid redundant representation of a number to be subtracted.

Referring once again to FIGS. 9a and 9b, one can observe from the tables shown that the redundant representation for the number zero, 910, if complemented using bitwise negation, produces the redundant representation for the number negative three, 920. Likewise, the complement of redundant representation, 911, produces similarly the redundant representation, 921, and so on for each valid redundant representation of zero shown in FIG. 9a. Therefore, any subtraction of zero using a carry-save adder would produce a result that was incorrect by a difference of exactly three if the redundant representation of negative zero were produced using bitwise negation as the complement. Further, that result could be corrected by adding any valid representation of three back into the sum produced by the carry-save adder.

As seen in the above description, when this correction method works for one valid redundant representation of a number is also works for all valid redundant representations of that number. FIG. 10 shows a mapping from valid three digit redundant representations of numbers from negative four (−4) through three (3) into valid three-digit redundant representations for the same range of numbers. From the table, it can be seen that the complement of a number N represented in redundant form is a valid redundant representation of −N−3 modulo the size of the set of numbers represented (in the case shown by FIG. 10, the set size is eight).

The method described above for subtracting two numbers, A and B, represented in redundant form, having vectors of carry bits, $C_A$ and $C_B$, and vectors of sum bits, $S_A$ and $S_B$, can be expressed as follows:

$$A - B = (S_A + 2C_A) - (S_B + 2C_B)$$
$$= (S_A + 2C_A) + (-S_B - 2C_B)$$
$$= (S_A + 2C_A) + ((\sim S_B + 1) + 2(\sim C_B + 1))$$
$$= (S_A + 2C_A) + (\sim S_B + 2(\sim C_B) + 3)$$

where a bitwise complement operation is indicated by the symbol, "~."

Thus an efficient method for generating a redundant representation corresponding to the negation of a number represented in redundant form, and for correcting that representation through use of a carry-save adder circuit to produce a valid result in redundant form corresponding to a subtraction operation is herein disclosed.

One embodiment of the present invention uses a circuit having functionality similar to the one shown in FIG. 7b or FIG. 7c to construct a carry-save adder structure like the one shown in FIG. 8. This adder completes the addition operation in two stages. Stage one, 810, receives as inputs three input bits for each digit in the representation of the numbers to be added and outputs two bits for each digit to stage two, 811. Each stage is a regular structure constructed of blocks like the one shown, 801, which perform the functions of the circuit shown in FIG. 7b. Stage two, 811, receives as inputs the intermediate sum and carry results from stage one, 810, and also receives a fourth input bit from each digit of one of the input operands. Stage two, 811, produces a redundant representation having a sum bit and a carry bit for each digit of the resulting sum of the two input operands.

Figure 11:
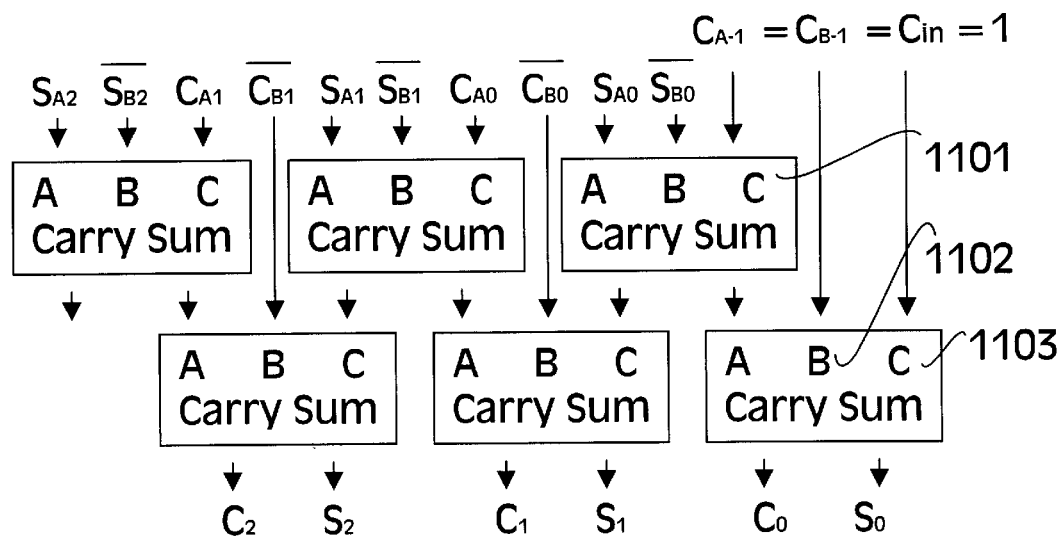
FIG. 11 shows one embodiment of a redundant adder being used to perform subtraction on operands received in redundant form using one possible arithmetic apparatus and one possible method of providing adjustment input.

FIG. 11 shows a carry-save adder structure, like the one described in FIG. 8, being used in one alternative embodiment of the invention to perform a subtraction operation A−B, where B is a number represented by any one of its possible valid redundant representations. In order to perform the subtraction operation, each of the carry bits and each of the sum bits in a redundant representation of B are complemented and supplied to the carry-save adder. Then a result is corrected by adding an adjustment of three. This is performed in FIG. 11, by setting three carry bits, $C_{A-1}$, $C_{B-1}$ and $C_{in}$ to a logic value of 1. When the combination of these three carry bits are received at the inputs provided in the carry-save adder circuit at, input 1101, input 1102 and input 1103, they are incorporated into the result. Thus the circuit configured as shown in FIG. 11, produces a valid redundant representation for the subtraction operation A−B.

Figure 12:
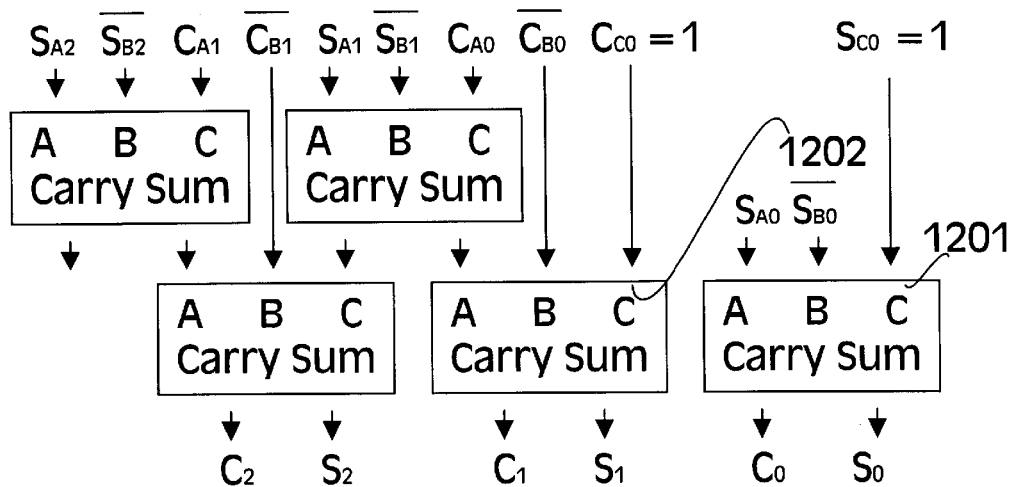
FIG. 12 shows another embodiment of a redundant adder being used to perform subtraction on operands received in redundant form using a second possible arithmetic apparatus and a second possible method of providing adjustment input.

FIG. 12 shows another alternate embodiment of the invention. As discussed above, any valid representation of the adjustment value can be used to correct the resulting sum. In FIG. 12, the least significant carry-save adder block receives, along with the least significant sum bits of the input operands, a least significant sum bit, $S_{CO}$, for the correction value at input 1201. The carry-save adder block that produces the second least significant digit, receives also a carry bit, $C_{CO}$, for the correction value at input 1202. Thus the circuit configured as shown in FIG. 12, also produces a valid redundant representation for the subtraction operation A−B.

By selecting a different form of redundant representation and perhaps a different redundant adder design, it is possible for those having skill in the art to change the adjustment value necessary to correct a result produced using the redundant adder circuit. It is also possible to use the method of the current invention to add and subtract more than two operands, thus changing the adjustment value or values necessary to correct the results produced.

Figure 13:
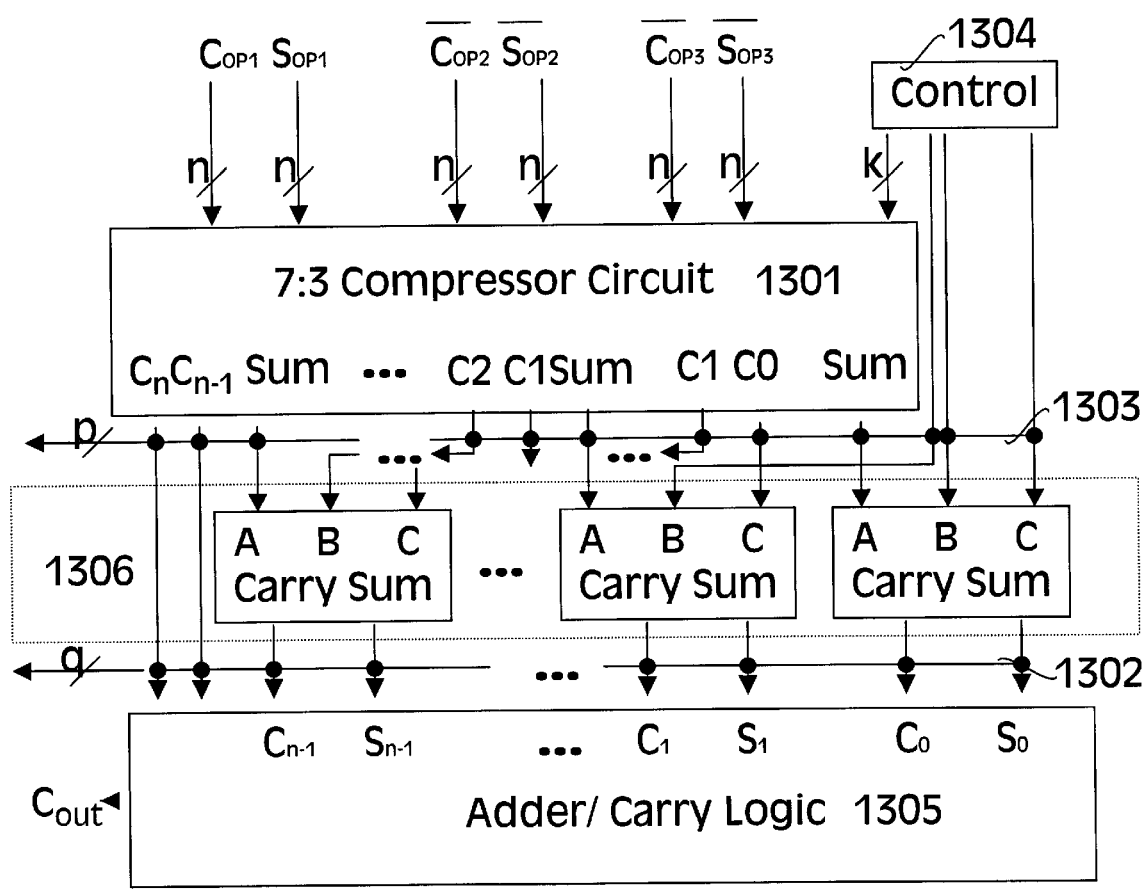
FIG. 13 shows another embodiment of a redundant adder being used to perform subtractions on operands received in redundant form using a third possible arithmetic apparatus capable of accepting up to three operands in redundant form and using a third possible method of providing adjustment input.

FIG. 13 shows another alternate embodiment of the invention, which can be used to sum three operands received in redundant form. Control device 1304 is used to correct the resulting sum through an adjustment input to a 7:3 compressor circuit, 1301, or a 3:2 compressor stage, 1306, or both. In FIG. 13, a result can be tapped for bypassing as an operand of another operation while in redundant form. If a result is tapped for bypassing after adder stage 1306 and before a carry propagation stage, 1305, as shown by the tap, 1302, then a bypassed operand is available in a redundant form having one carry bit and one sum bit per digit, similar to that of the input operands, without needing to wait for carry propagation. But a result could also be tapped for bypassing before stage 1306, as shown by tap, 1303. In such a case, the operand is in a second redundant form having two carry bits and one sum bit per digit. The adder shown in FIG. 13 is capable of accepting two operands in this second redundant form, and control 1304 can provide adjustment input to either circuit 1301 or circuit 1306 or both to correct results when inputs are provided in either redundant form. Thus the circuit configured as shown in FIG. 13, produces valid redundant representation for two or three operand addition/subtraction operations.

Figure 14:
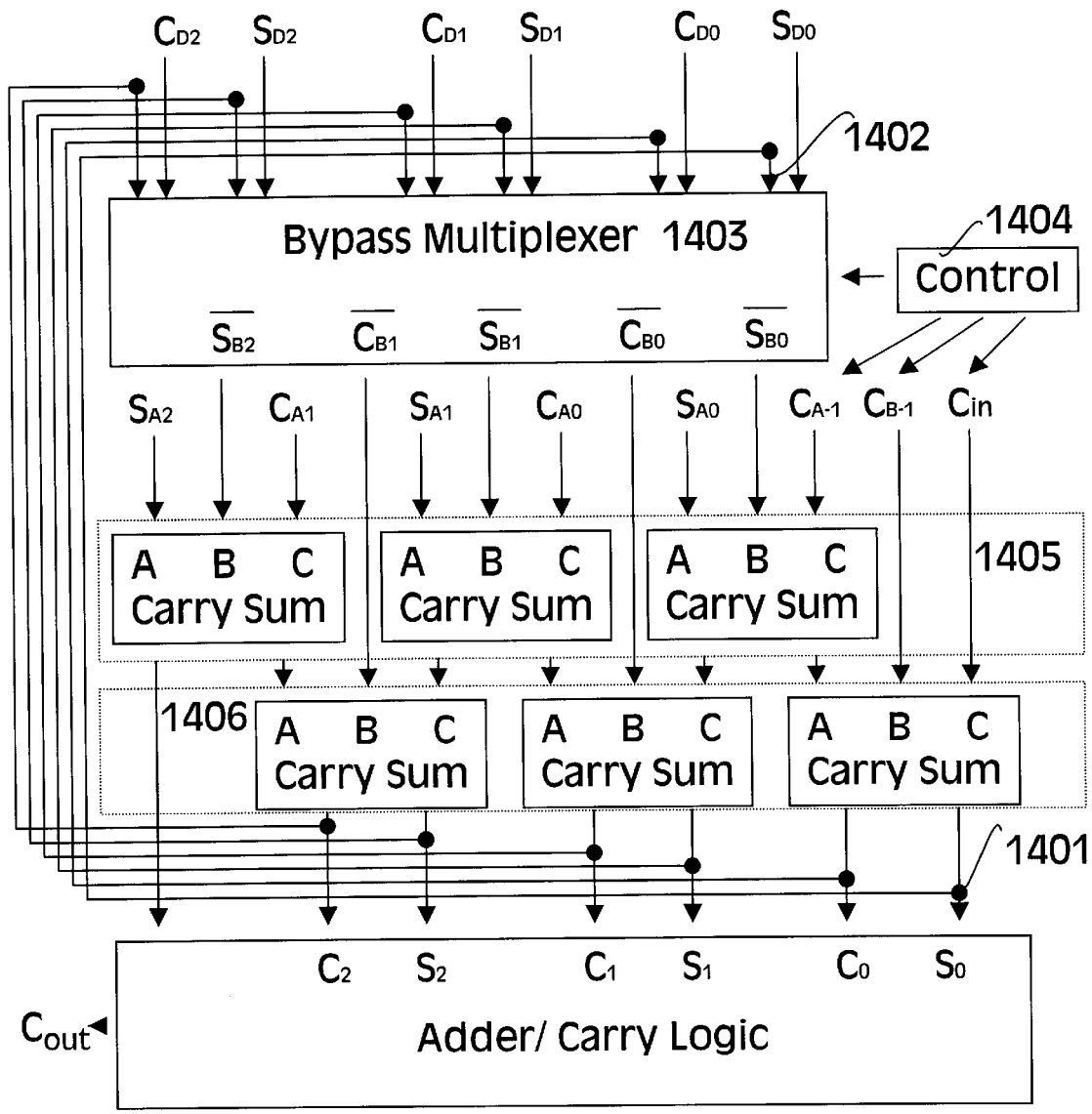
FIG. 14 shows another embodiment a redundant adder being used to perform subtraction on operands received in redundant form with a fourth possible arithmetic apparatus and a detailed illustration of one possible method to bypass operands in redundant form.

FIG. 14 shows another alternate embodiment of the invention including a bypass multiplexer, 1403, to receive, at input 1402, a result bypassed from a tap, 1401, on the output of adder stage 1406. Control device, 1404, selects between an input operand, D, and a bypassed operand, 1402. If the operation to be performed is a subtraction, then Control device, 1404, also selects a complemented output to supply to the B input of adder stage, 1405, and sets adjustment input appropriately. In this case, adjustment input is set as shown in FIG. 11.

Figure 15:
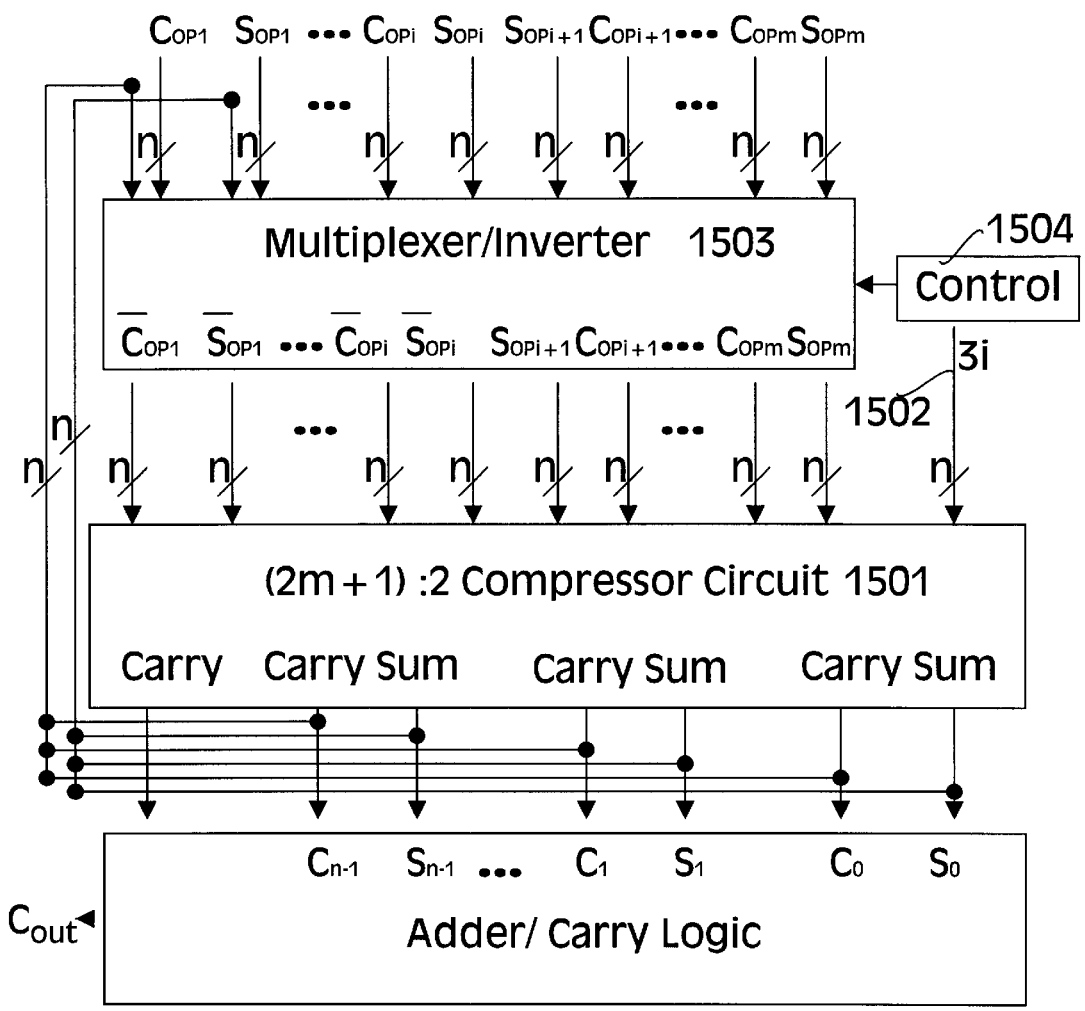
FIG. 15 shows another embodiment of a redundant adder being used to perform subtraction on operands received in redundant form with a fifth possible arithmetic apparatus capable of accepting m operands, each operand comprising n digits represented in redundant form, and subtracting i operands from the sum of the remaining m−i operands. Any of the m operands can be bypassed from results, tapped in redundant form at the outputs of one of a plurality of stages, in similar or dissimilar redundant arithmetic apparatuses.

FIG. 15 shows another alternate embodiment of the invention, which accepts up to m operands in a redundant form. The inputs can be bypassed from a compressor stage of circuit 1501 or from some other arithmetic circuit or supplied by a register file or by memory storage. Operands have n digits, each digit including a carry bit and a sum bit. Any number, i, of the m operands (for I between zero and m) may be negated by complementing the appropriate i*2n output bits of multiplexer/inverter, 1503, under the direction of control, 1504, and adjusting the result produced by circuit 1501 by adding 3i via input, 1502, which is also directed by control, 1504.

Figure 16A:
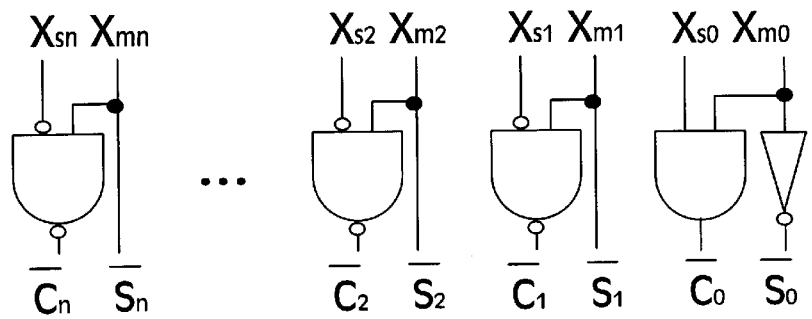
FIG. 16a shows one embodiment of a circuit for complementing a number received in a signed-digit redundant form for subtraction according to the method of FIG. 17.

FIG. 16a shows one possible circuit to generate a complemented form of a number received in redundant form. The number provided to the circuit is represented in a signed-digit redundant form. The number generated by the circuit is in a carry-sum redundant form and complemented in accordance with the methods presently disclosed for the sake of illustration.

Figure 16B:
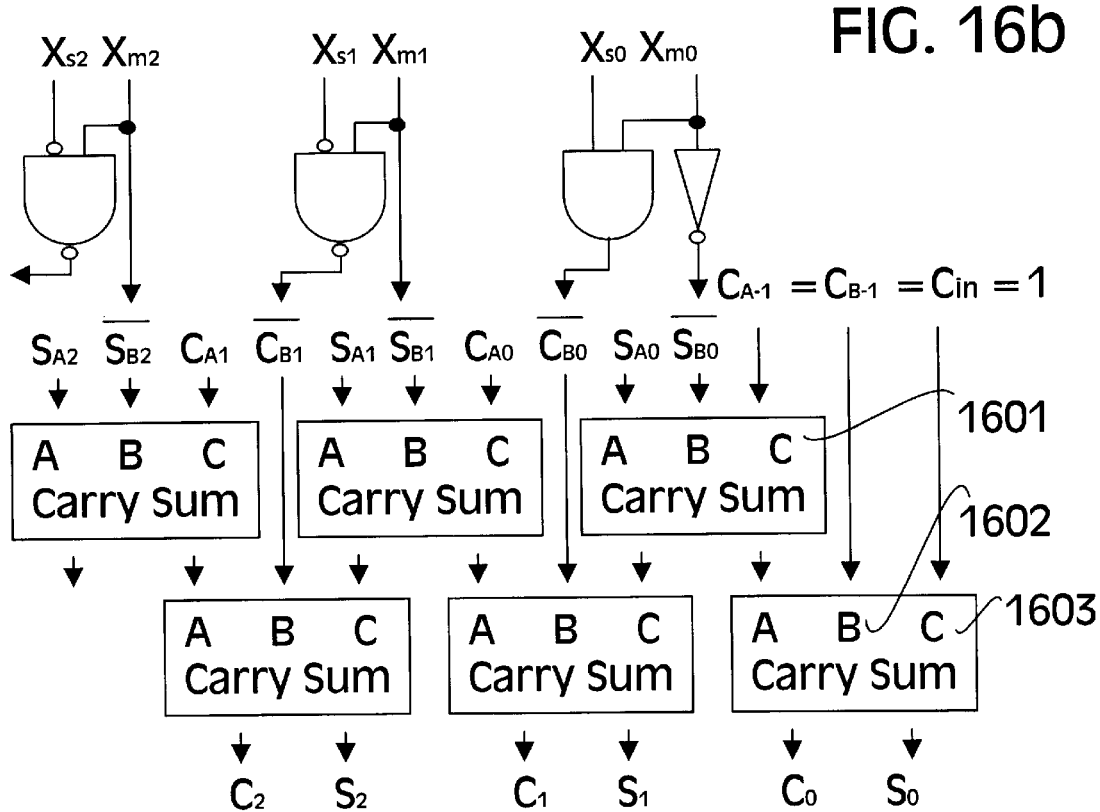
FIG. 16b shows an embodiment of a circuit capable of performing addition and subtraction operations on numbers received in a signed-digit redundant form or a carry-sum redundant form.

FIG. 16b shows a carry-save adder structure, like the one described in FIG. 8, being used in combination with the complementing circuit of FIG. 16a in another alternative embodiment of the invention to perform a subtraction operation A−B, where B is a number represented by any one of its possible valid signed-digit redundant representations. In order to perform the subtraction operation, all but the least significant signed-bit is negated, and each of the resulting sign-bits is ANDed with its respective magnitude-bit and then, all but the least significant result is negated. Finally, only the least significant magnitude-bit is negated. Thus the complemented carry bits and sum bits in a redundant representation of B are generated and supplied to the carry-save adder. Then a result is corrected by adding an adjustment of three. This is performed in FIG. 16b, by setting three carry bits, $C_{A-1}$, $C_{B-1}$ and $C_{in}$ to a logic value of 1. When the combination of these three carry bits are received at the inputs provided in the carry-save adder circuit at, input 1601, input 1602 and input 1603, they are incorporated into the result. Thus the circuit configured as shown in FIG. 116b, produces a valid redundant representation for the subtraction operation A−B.

It should be apparent that the methods herein disclosed can be modified in arrangement and detail by those skilled in the art without departing from the principles of the present invention.

Figure 17:
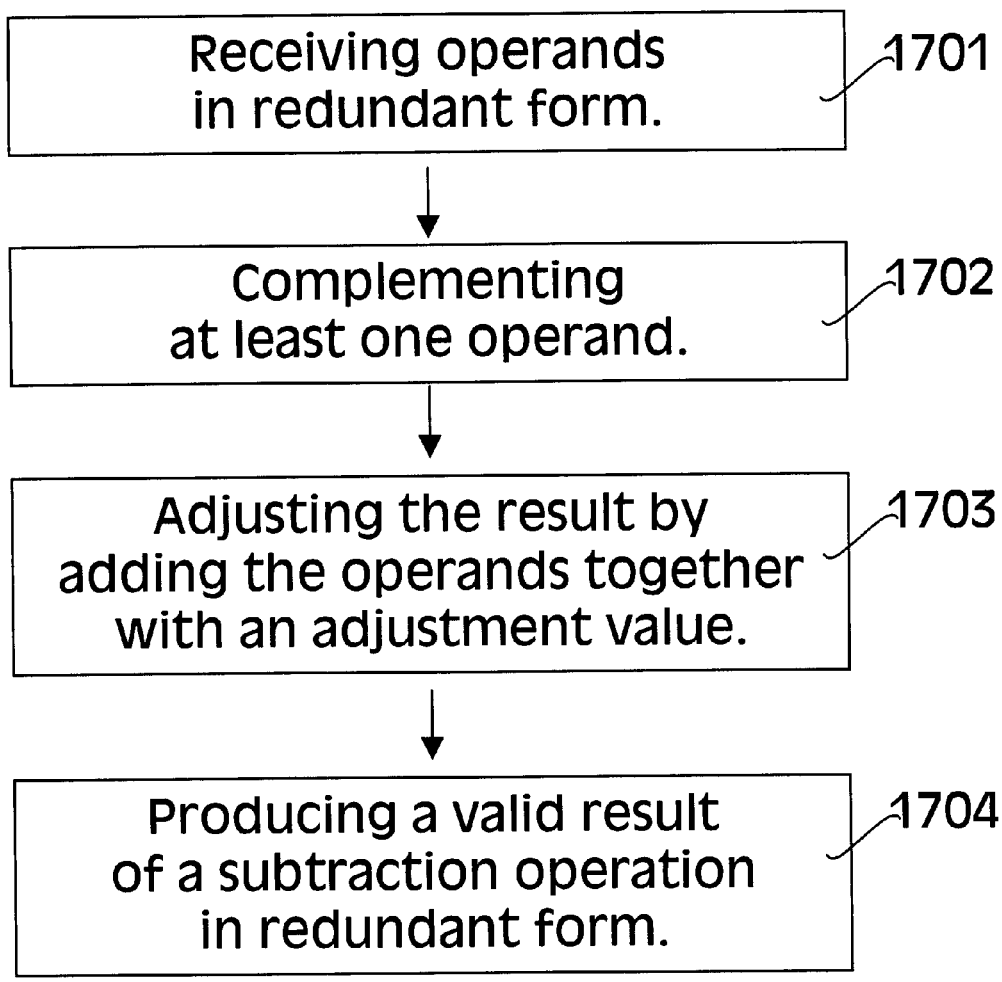
FIG. 17 shows a method for performing subtraction in redundant form arithmetic.

FIG. 17 summarizes the method for subtracting numbers represented in redundant form. The method comprises complementing, in 1702, at least one of the operands received in redundant form, in 1701; and adjusting a result produced by adding an adjustment value, in 1703, to produce a valid outcome of a subtraction operation, in 1704, represented in redundant form. As was discussed previously, and adjustment value that is a multiple of three will produce valid outcomes using carry save arithmetic and redundant digits having one carry bit and one sum bit.

In order to compare results produced in redundant form quickly, it is desirable to make use of a non-propagative comparator so that the result can be obtained prior to carry propagation. Cortadella et al. have described an equality comparison circuit for use with two's complement arithmetic in an article entitled, "Evaluation of A+B=K Conditions Without Carry Propagation," found in IEEE Transactions on Computers, vol. 41, No. 11, November 1992. A similar circuit can be used to compare results in redundant form.

Figure 18A:
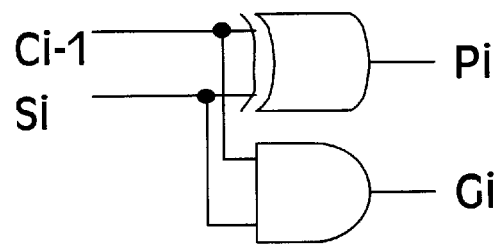
FIG. 18a shows one possible way that a carry-propagate signal and a carry-generate signal can be produced inside an adder/carry logic circuit for use with numbers in carry-sum redundant form.

FIG. 18a shows a half adder with inputs of a sum-bit and a carry-bit to be added together. This is one way that a carry-propagate signal and a carry-generate signal can be produced inside an adder/carry logic circuit for use with numbers in carry-sum redundant form.

Figure 18B:
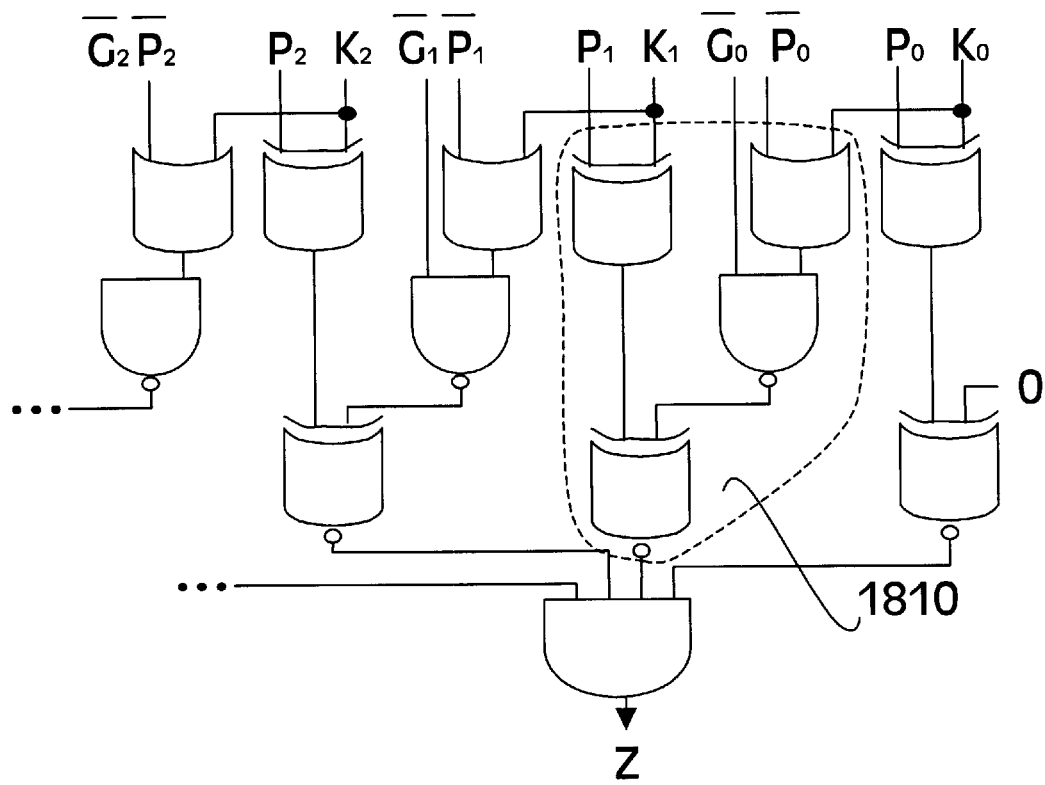
FIG. 18b shows one possible circuit for generating an equality comparison result using carry-propagate signals and carry-generate signals without requiring carry propagation.

FIG. 18b shows one possible circuit for generating an equality comparison result using carry-propagate signals and carry-generate signals without requiring carry propagation. The circuit 1810 produces an equality comparison for digit 1 of the redundant representation to digit 1 of a number K. Likewise, similar circuits produce results for each digit position. The final comparison result is collected into Z, without need for carry propagation. The circuit shown provides the capability of determining whether an arithmetic result equals K before identification of the result's sign, or propagation of carry signals to the result's most significant position can be completed.

Figure 19A:
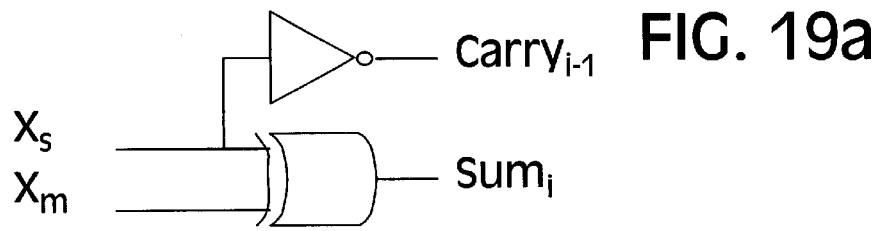
FIG. 19a shows one possible circuit for generating carry-sum inputs for the circuit of FIG. 18a from a number represented in signed-digit redundant form.

FIG. 19a shows another circuit for generating a carry-sum representation from a signed-digit representation. The values produced are suitable inputs for the circuit of FIG. 18a. Therefore the circuit of FIG. 18b can also be used if the result to be compared is in a sign-digit redundant representation.

Figure 19B:
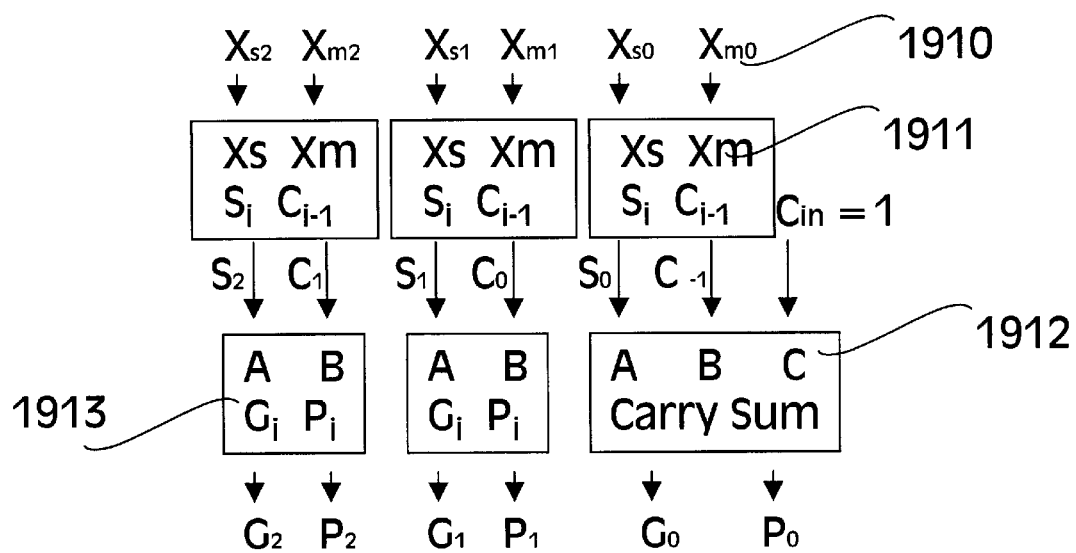
FIG. 19b shows one possible way that a carry-propagate signal and a carry-generate signal can be produced inside an adder/carry logic circuit for use with numbers in signed-digit redundant form.

FIG. 19b shows a circuit that could be part of an adder/carry logic circuit generating a carry-propagate signal and a carry-generate signal suitable for use with the non-propagative comparator circuit of FIG. 18b. The sign and magnitude values at a digit such as 1910 are input to a circuit 1911, which is similar the one shown in FIG. 19a. The results are combined using 3:2 compressor circuitry 1912 and half adder circuitry 1913 to produce carry-generate and carry-propagate signals suitable for use with the non-propagative comparator circuit of FIG. 18b.

Figure 20:
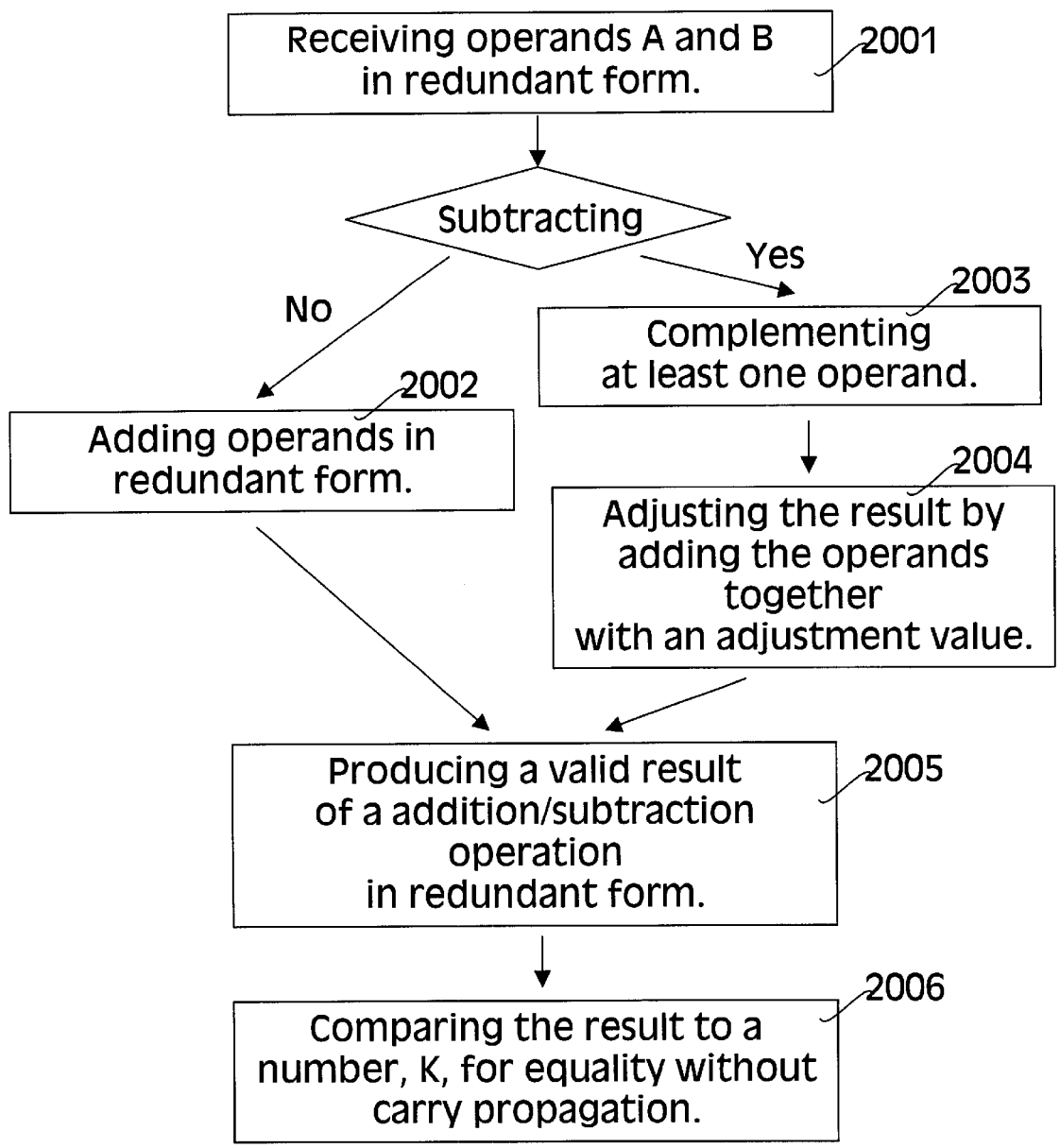
FIG. 20 shows a method for performing an addition or a subtraction in redundant form arithmetic and also performing an equality comparison without carry propagation for any of the operations.

FIG. 20 shows a method for performing an addition or a subtraction in redundant form arithmetic, thereby producing a valid result in redundant form, and also performing an equality comparison without carry propagation for any of the required operations.

Figure 21A:
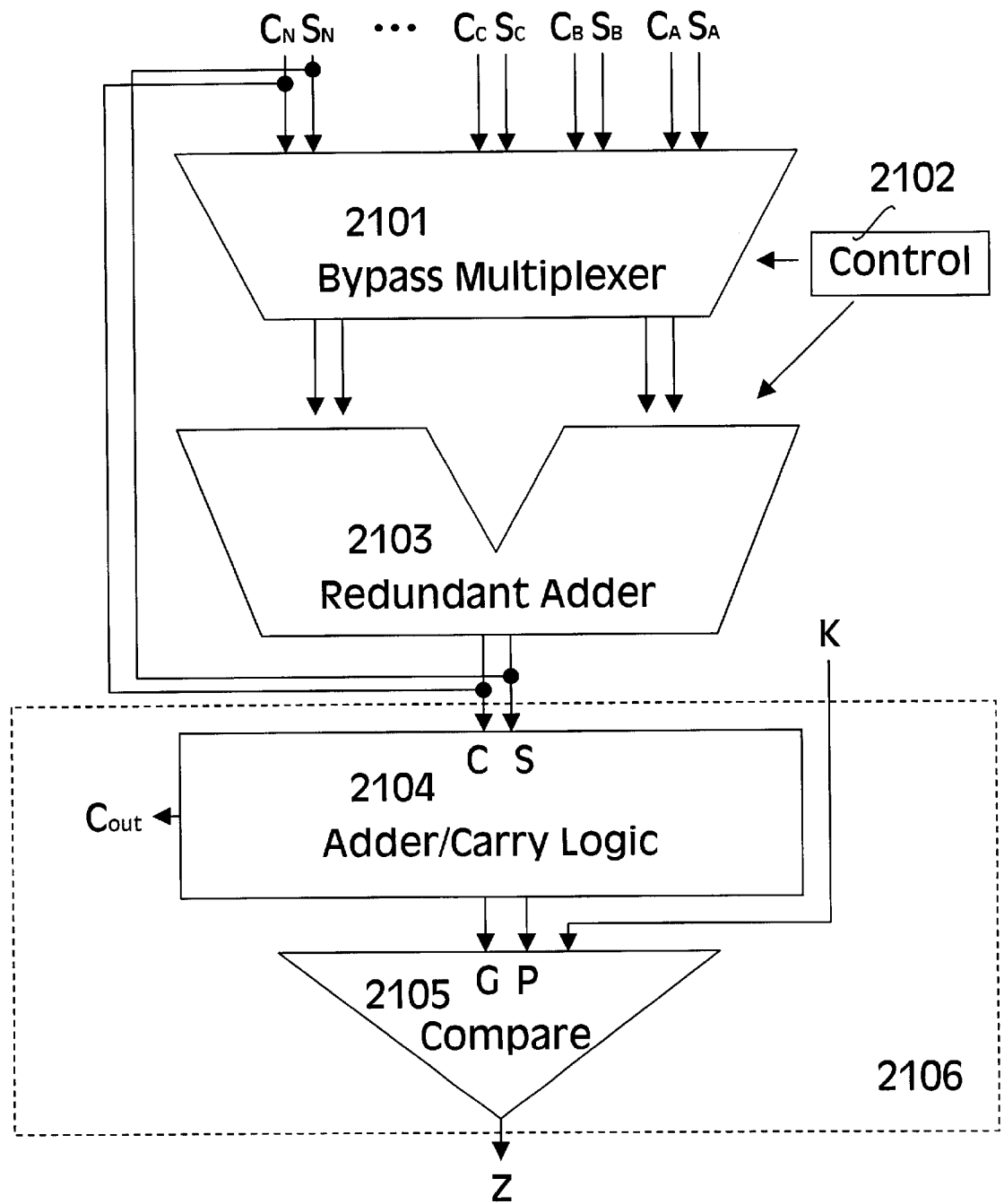
FIG. 21a shows one embodiment of a circuit with a redundant adder being used to perform addition or subtraction on operands received in a carry-sum redundant form, the operands possibly bypassed from similar or dissimilar circuits, and also with compare logic, similar to that shown in FIG. 18b, being used to perform an equality comparison without requiring carry propagation.

FIG. 21a shows one embodiment of a circuit, which can implement the method described in FIG. 20 with a redundant adder 2103 being used to perform addition or subtraction on operands received in a carry-sum redundant form and with input from control 2102 in accordance with the current method. The operands are possibly bypassed through bypass multiplexer 2101 from similar or dissimilar circuits. FIG. 21a further shows the current method implemented with a non-propagative comparator 2106 comprising adder/carry logic 2104 and compare logic 2105. The compare logic 2105 is similar to that shown in FIG. 18b, and is being used to perform an equality comparison without requiring carry propagation. As shown in FIG. 18a, the necessary carry-generate and carry-propagate signals can be provided from the redundant result by adder/carry logic 2104 without need for carry propagation.

Figure 21B:
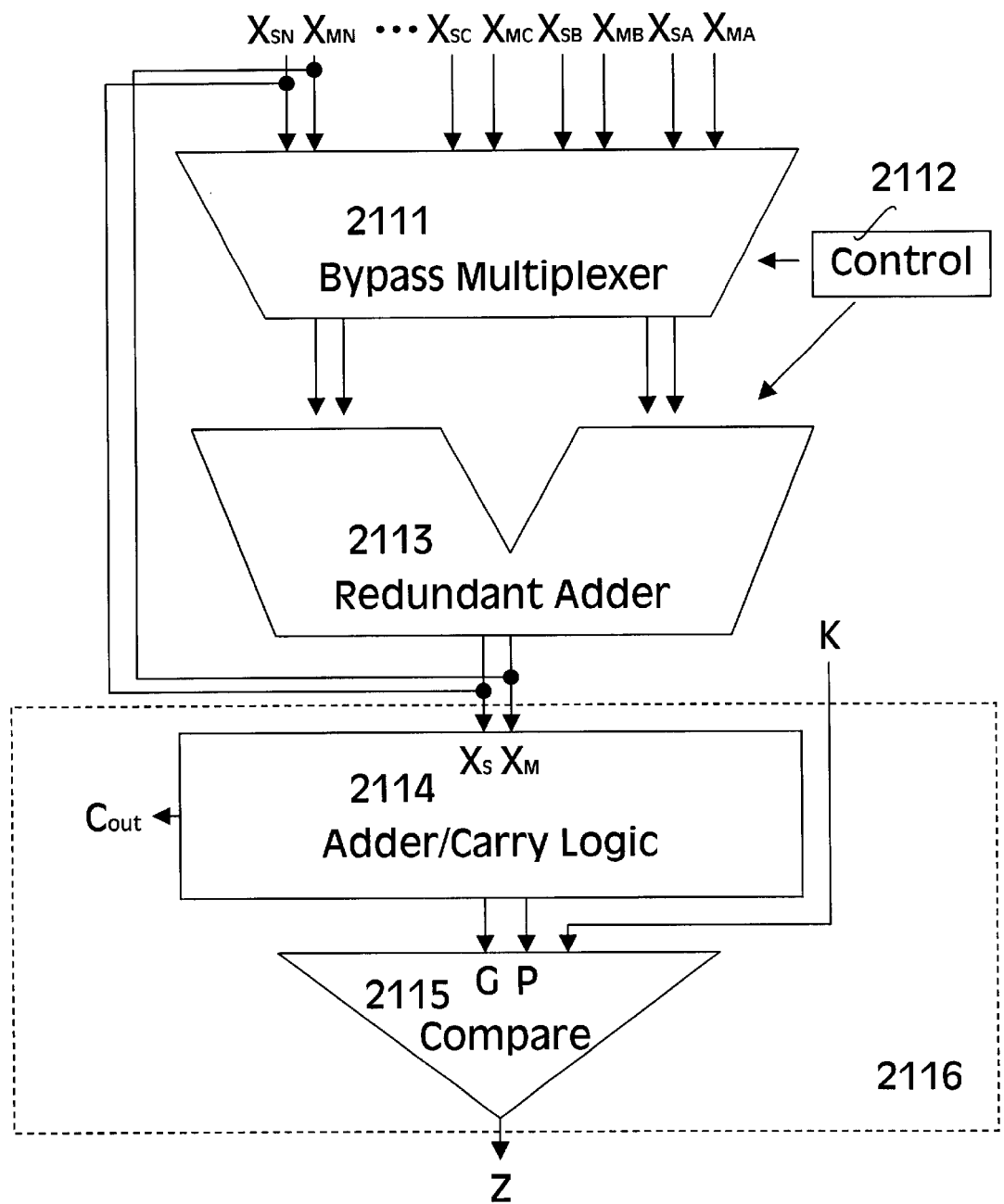
FIG. 21b shows another embodiment of a circuit with a redundant adder being used to perform addition or subtraction on operands received in a signed-digit redundant form, the operands possibly bypassed from similar or dissimilar circuits, and also with compare logic, similar to that shown in FIG. 18b, being used to perform an equality comparison without requiring carry propagation.

FIG. 21b shows another embodiment of a circuit, which can implement the method described in FIG. 20 with a redundant adder 2113 being used to perform addition or subtraction, this time on operands received in a signed-digit redundant form and with input from control 2112 in accordance with the current method. The operands are possibly bypassed through bypass multiplexer 2111 from similar or dissimilar circuits. FIG. 21b further shows the current method implemented with a non-propagative comparator 2116 comprising adder/carry logic 2114 and compare logic 2115. The compare logic is similar to that shown in FIG. 18b, and is being used to perform an equality comparison without requiring carry propagation. As shown in FIG. 19b, the necessary carry-generate and carry-propagate signals can be provided from the redundant result by adder/carry logic 2114, also without need for carry propagation.

Thus what has been disclosed enables performing, at very high computation rates, efficient bypassing of operands in redundant form for operations including addition, subtraction and equality comparisons of redundant arithmetic results to another number provided to the comparator.

FIG. 22 shows another alternate embodiment of the invention employed in a digital computing system. The instruction decoder, 2201, is capable of decoding instructions including but not limited to addition instructions, subtraction instructions, compare instructions and branch instructions. Many of the digital functions may be implemented with redundant form arithmetic circuitry including but not limited to multiplication, division, address generation, comparisons, addition and subtraction. In particular redundant adder, 2206, uses redundant form circuitry to perform subtraction in the manner previously disclosed. When an instruction completes, the results are converted from redundant form through redundant conversion unit, 2204, and written into register file, 2205. If a subtraction or comparison instruction requires, as an operand, a result from a previous instruction, the result may be bypassed in redundant form via bypass(es), 2207, under the direction of bypass routing control, 2203. The result may be supplied by any of the functional units that use redundant form representations. Control, 2202, directs the negation of the bypassed operand through generating complemented redundant forms of its digits and augmenting the redundant arithmetic result with a correction value supplied as input to redundant adder, 2206. Thus, results may be bypassed as operands in redundant form and valid results may be produced in redundant form for subtraction operations. Results produced by redundant arithmetic circuitry and transmitted in redundant form can be compared to zero or to some other number K in non-propagative compare circuitry 2208.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. An apparatus comprising:
    a redundant arithmetic circuit to perform an arithmetic operation on a plurality of operands, one or more of the operands received by the redundant arithmetic circuit being represented in redundant form, and said arithmetic circuit to generate a valid first result of the arithmetic operation represented in redundant form, the first result having a least significant digit and a most significant digit;
    a comparator circuit operatively coupled with the arithmetic circuit to receive the first result in redundant form, the comparator circuit also to receive a first expected value and to perform an equality comparison of the first result represented in redundant form to the first expected value, and to generate a second result indicating the truth of said equality comparison, the comparator circuit generating said second result independent of any propagation path to facilitate carry signal propagation from the least significant digit to the most significant digit.

2. The invention recited in claim 1 wherein said first expected value is an input to the comparator circuit represented in two's complement form.

3. The invention recited in claim 1 wherein said arithmetic operation is a subtraction operation and said apparatus further comprises:
    receiving circuitry to generate a complemented redundant form of at least one operand received by the redundant arithmetic circuit in redundant form, and
    a control unit to direct adjustment input to the redundant arithmetic circuit to adjust a result produced through the arithmetic circuit to generate said valid first result of the subtraction operation represented in redundant form.

4. The invention recited in claim 3 wherein the complemented redundant form is a carry-sum redundant form.

5. The invention recited in claim 4 wherein the adjustment input to the redundant arithmetic circuit adjusts the result produced by 3 to generate said valid first result of the subtraction operation represented in redundant form.

6. A method comprising:
    receiving a plurality of operands in redundant form;
    performing an arithmetic operation on the plurality of operands, the arithmetic operation consisting of
        generating a complemented redundant form of at least one of the plurality of operands represented in redundant form and
        providing adjustment input to an arithmetic circuit to augment a result produced through the arithmetic circuit to generate a valid outcome represented in redundant form as a result of a subtraction operation if the arithmetic operation is subtraction, otherwise
        generating a valid outcome represented in redundant form as a result of an addition operation; and then
        comparing the result to a first value using a non-propagative comparator to determine equality or inequality of the result to the first value.

7. The invention recited in claim 6 wherein said first value is an input to the non-propagative comparator represented in two's complement form.

8. A digital computing system comprising:
    an arithmetic device to add numbers in a redundant form,
    bypass circuitry to bypass results in a redundant form as input to the arithmetic device,
    a complementing device to complement at least one number supplied to the arithmetic device, and
    a control unit to direct adjustment input to the arithmetic device to adjust a result produced by adding to generate a valid outcome of a subtraction operation represented in a redundant form
    a non-propagative comparator circuit to determine equality or inequality of a first value to the outcome represented in redundant form.

9. The invention recited in claim 8 wherein said first value is an input to the non-propagative comparator represented in two's complement form.

10. An apparatus for comparing numbers represented in redundant form comprising:
    a redundant arithmetic circuit to perform a subtraction operation on a plurality of operands, one or more of the operands received byte redundant arithmetic circuit being represented in redundant form, and said arithmetic circuit to generate a valid first result of the subtraction operation represented in redundant form, the first result having a least significant digit and a most significant digit;
    a comparator circuit to perform an equality comparison of the first result represented in redundant form to a first value, and to generate a second result from the first result indicating the truth of said equality comparison, the comparator circuit generating said second result dependent upon no propagation path to facilitate carry signal propagation from the least significant digit to the most significant digit.

11. The invention recited in claim 10 wherein said first value is an input to the comparator circuit represented in two's complement form.

12. The invention recited in claim 10 wherein said apparatus further comprises:
    circuitry to generate a complemented form of at least one of the operands received in redundant form.

13. The invention recited in claim 12 wherein the complemented form is a carry-sum redundant form.

14. The invention recited in claim 12 wherein said apparatus further comprises:
    a control unit to direct adjustment input to the arithmetic circuit to adjust a result generated through the arithmetic circuit to generate the valid first result of the subtraction operation represented in redundant form.

15. The invention recited in claim 14 wherein the adjustment input to the arithmetic circuit adjusts the result by adding a multiple of 3 to generate said valid first result of the subtraction operation represented in redundant form.

16. A digital computing system comprising:
    an arithmetic device to add a plurality of numbers in redundant form;

bypass circuitry to bypass a result in a redundant form as input to the arithmetic device;

a receiving circuit to receive the result from the bypass circuitry and to generate a complemented redundant form of at least one number supplied to the arithmetic device;

a control unit to direct an adjustment input to the arithmetic device to adjust a result produced by adding to generate an outcome of a subtraction operation represented in a redundant form; and a non-propagative comparator circuit to determine, prior to completing carry propagation for said subtraction operation, equality or inequality of the outcome to an expected value.

17. The invention recited in claim 16 wherein the result is bypassed in a carry-sum redundant form.

18. The invention recited in claim 16 wherein equality or inequality of the outcome and the expected value is determined before a sign of the outcome can be generated.

19. The invention recited in claim 16 wherein said expected value is an input to the non-propagative comparator circuit represented in two's complement form.

* * * * *

UNITED STATES PATENT AND TRADEMARK OFFICE
CERTIFICATE OF CORRECTION

PATENT NO. : 6,763,368 B2
DATED : July 13, 2004
INVENTOR(S) : Bhushan et al.

It is certified that error appears in the above-identified patent and that said Letters Patent is hereby corrected as shown below:

Column 7,
Line 60, delete "$S_{CO}$" and insert -- $S_{C0}$ --.
Line 63, delete "$C_{CO}$" and insert -- $S_{C0}$ --.

Column 12,
Line 31, delete "byte" and inset -- by the --.

Signed and Sealed this

Twenty-first Day of September, 2004

JON W. DUDAS
*Director of the United States Patent and Trademark Office*